Feb. 9, 1932.  G. A. BUTTRESS  1,844,144
METHOD OF MAKING RIB LATH
Filed Nov. 23, 1926   4 Sheets-Sheet 2
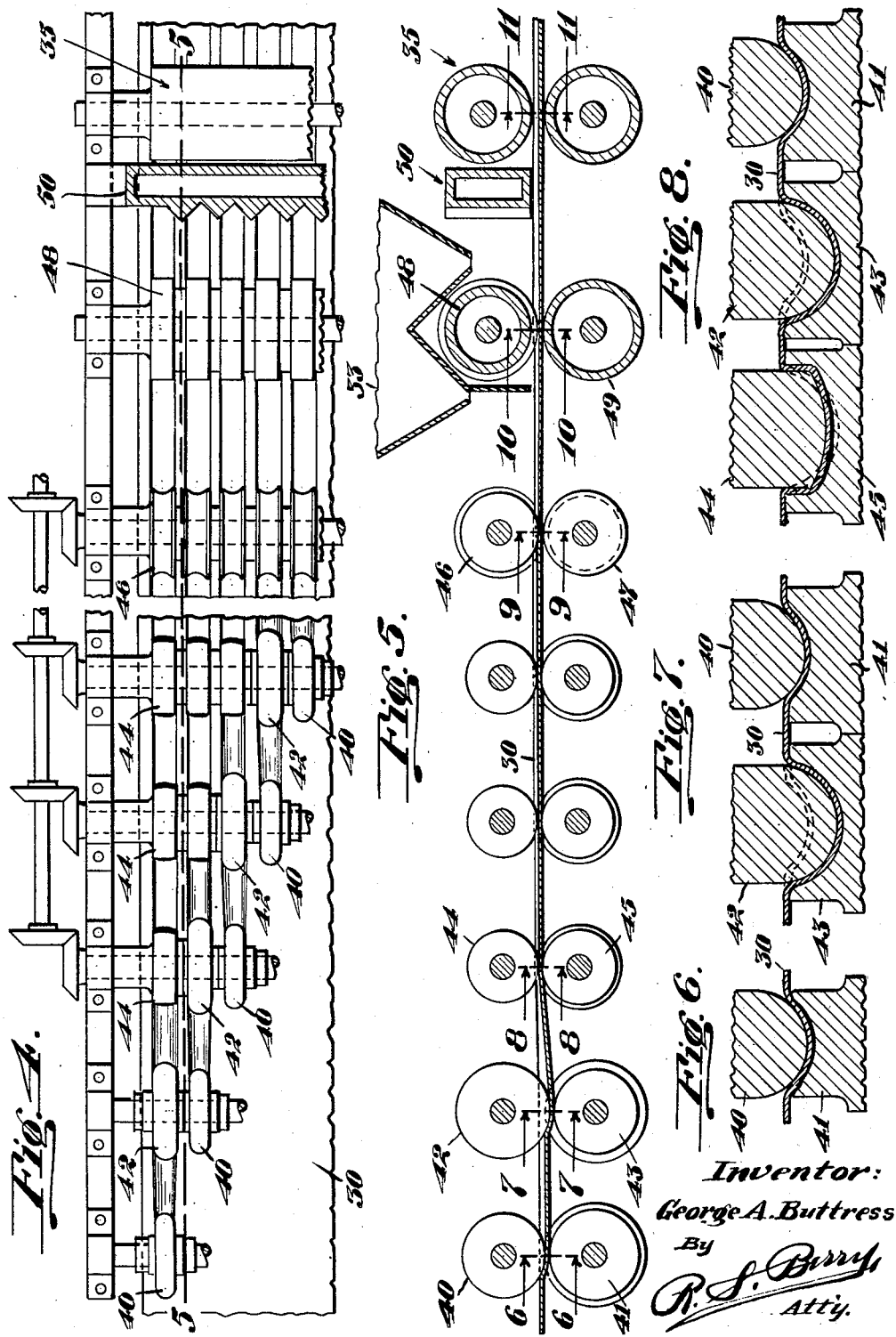
Inventor:
George A. Buttress
By R. S. Berry
Atty.

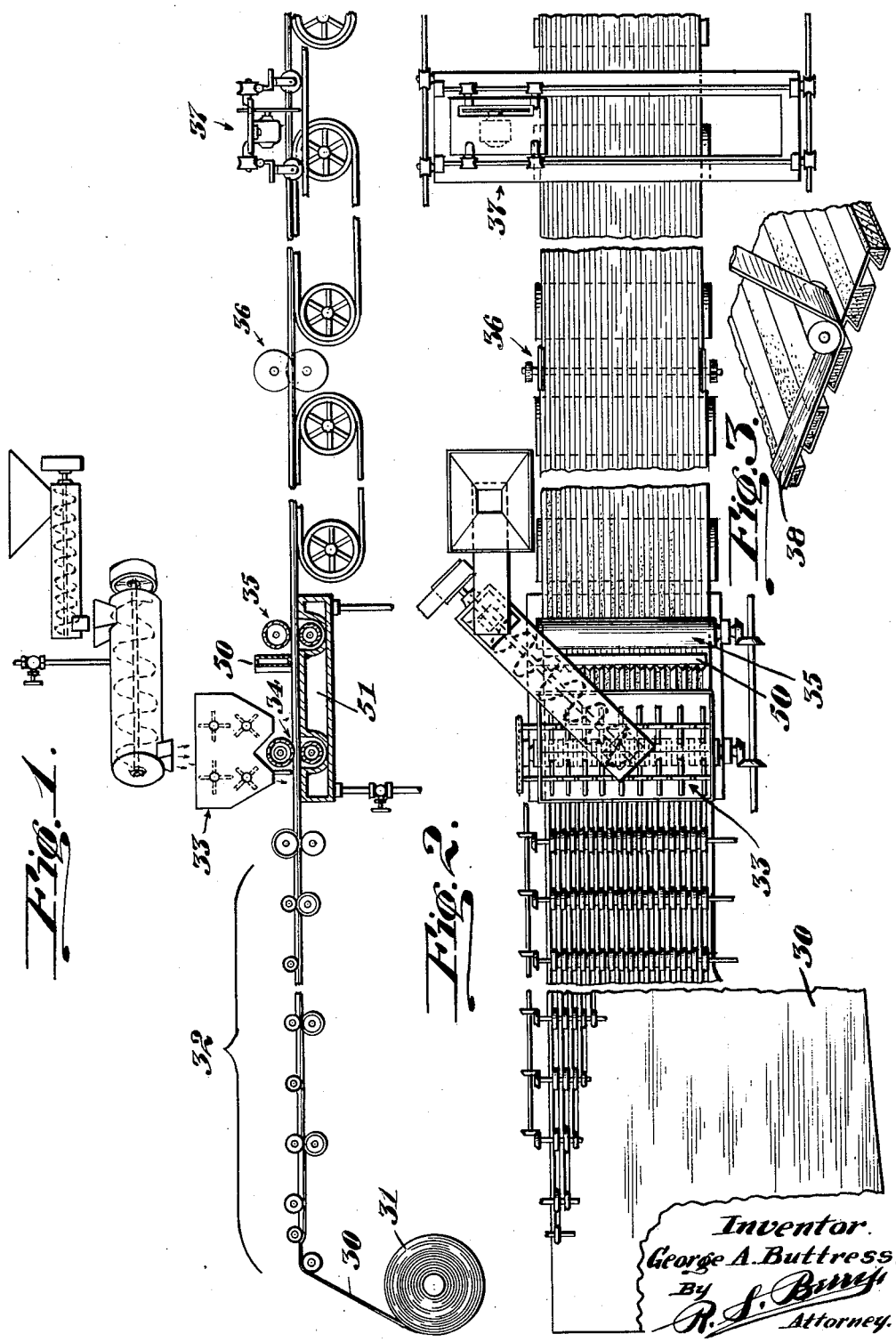

Feb. 9, 1932.  G. A. BUTTRESS  1,844,144
METHOD OF MAKING RIB LATH
Filed Nov. 23, 1926  4 Sheets-Sheet 3
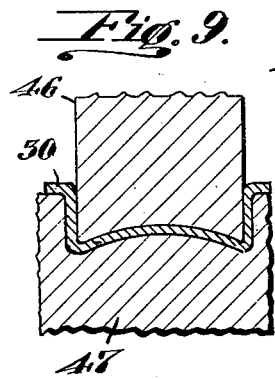
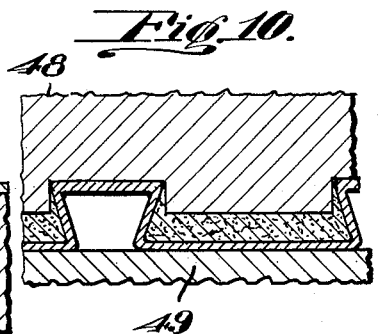
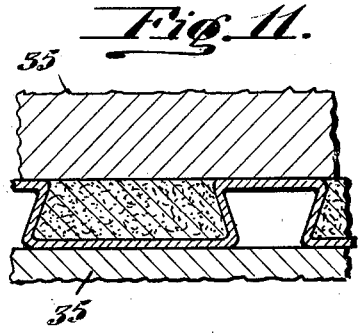
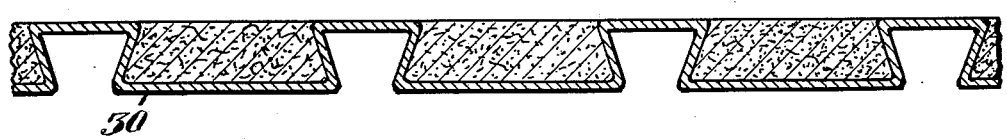
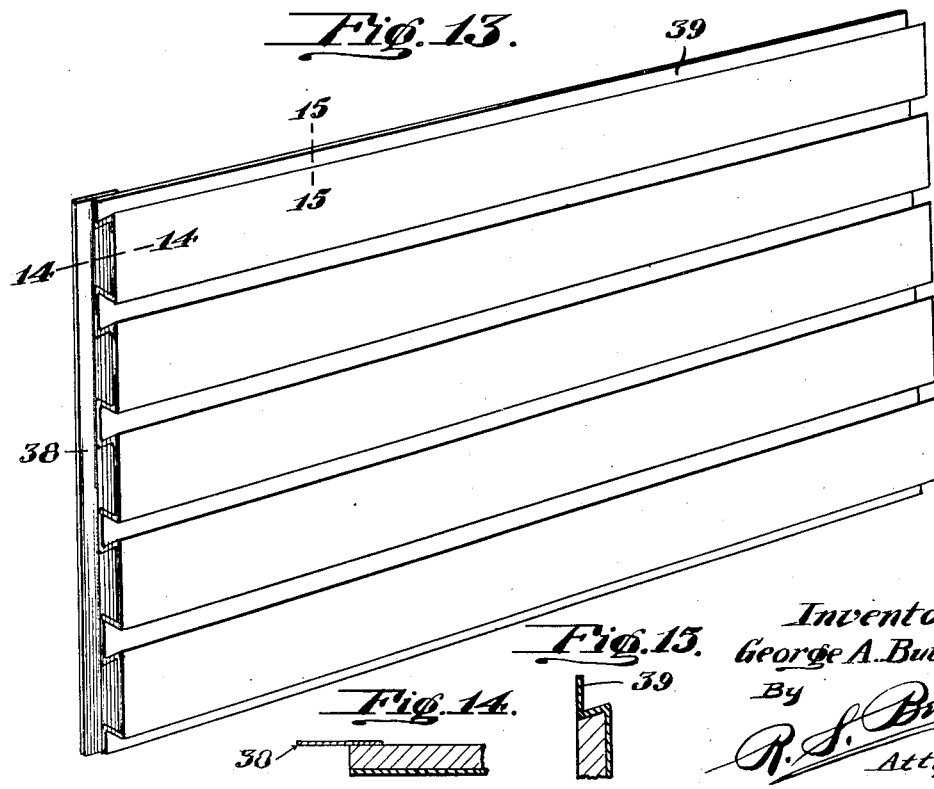

Feb. 9, 1932.   G. A. BUTTRESS   1,844,144
METHOD OF MAKING RIB LATH
Filed Nov. 23, 1926   4 Sheets-Sheet 4
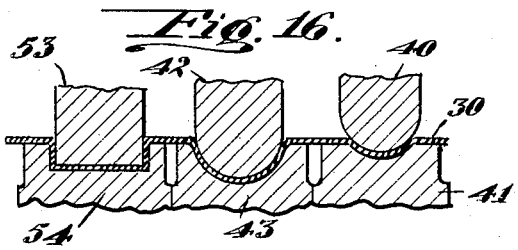
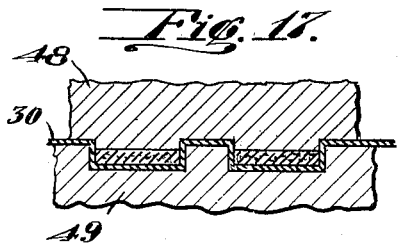
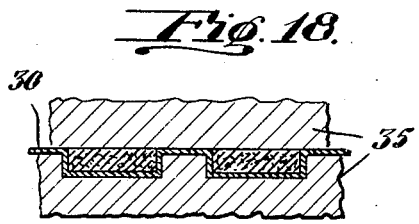
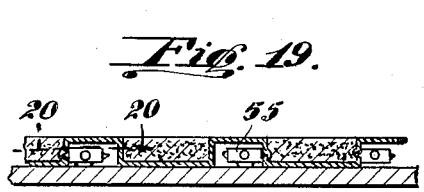
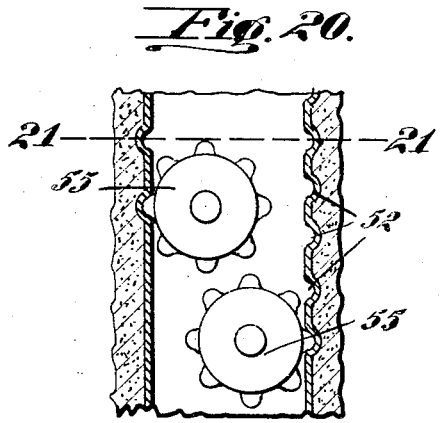
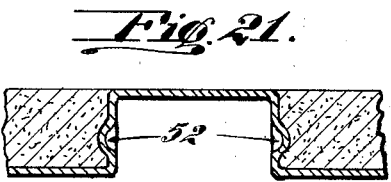
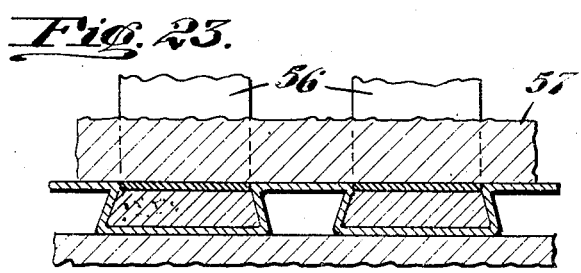
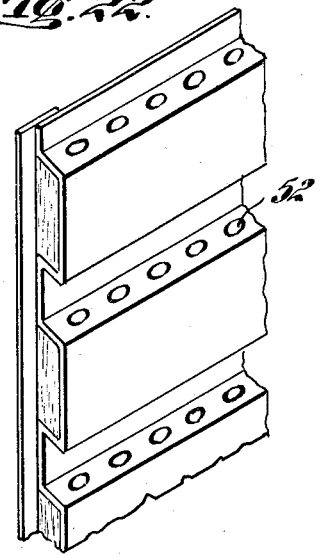
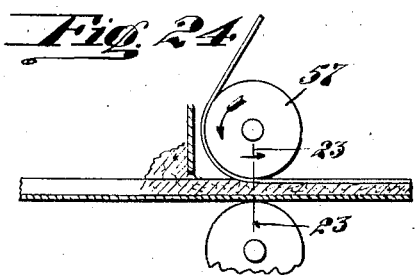
Inventor
George A. Buttress
By R. S. Berry
Atty.

Patented Feb. 9, 1932

1,844,144

UNITED STATES PATENT OFFICE

GEORGE A. BUTTRESS, OF LOS ANGELES, CALIFORNIA

METHOD OF MAKING RIB LATH

Application filed November 23, 1926. Serial No. 150,250.

This invention relates to a method of making a fabricated lath of the type embodying a hardened plastic composition supported on a fibrous backing sheet and formed in panels having channels for affording a bond with a plaster coating. An object of the invention is to provide a method of making a composition lath panel which is flexible or bendable in one direction so that it may be curved transversely, yet is rigid and resistant to bending strain longitudinally. Another object is to provide a method of making a lath embodying a fibrous backing sheet having composition ribs supported in channels formed in the sheet, in which the rib supporting channels are formed in a smooth flat sheet by gathering and bending the material by a gradual drawing or pulling of the material transversely into the flutes or corrugations in contradistinction to stretching or folding the material as commonly practiced, so as to avoid weakening or rupturing the sheet. A further object is to provide a method of manufacturing a lath of the type above referred to whereby it may be economically produced, whereby it may be formed in a continuous ribbon and thereafter cut into panels of commercial dimension and whereby the fibrous backing sheet may be fluted lengthwise preparatory to receiving the composition ribs so that the grain of the sheet will extend in a direction of the length of the rib formed thereon. Other objects will appear hereinafter.

The invention is illustrated in the accompanying drawings in which—Fig. 1 is a diagram in side elevation of a mechanism for manufacturing the lath and depicting the method whereby the lath is formed; Fig. 2 is a plan view of the structure illustrated in Fig. 1; Fig. 3 is a detail in perspective showing the manner of applying a marginal flap to the lath panel; Fig. 4 is a detailed plan view of the lath forming mechanism with portions broken away; Fig. 5 is a view in vertical section as seen on the line 5—5 of Fig. 4; Figs. 6, 7, 8, 9, 10, and 11 are enlarged details in cross section as seen on the correspondingly designated lines in Fig. 5, showing the steps employed in forming the lath; Fig. 12 is a detail in cross section illustrating the finished product; Fig. 13 is a perspective view of the fabricated lath; Figs. 14 and 15 are details in section as seen on the correspondingly designated lines of Fig. 13, showing the manner of forming the lath panel with marginal flaps; Figs. 16, 17, 18 and 19 are details in section illustrating a modification of the invention; Fig. 20 is an enlarged detail in horizontal section as seen on the line 20—20 of Fig. 19; Fig. 21 is a detail in section as seen on the line 21—21 of Fig. 20; Fig. 22 is a view in perspective illustrating a modified construction of the lath panel by forming it in the manner depicted in Figs. 16 to 20 inclusive; Fig. 23 is a detail in cross section of a fragmentary portion of the lath showing the manner in which the composition rib may be reinforced by a backing strip; and Fig. 24 is a diagram illustrating the manner of applying the backing strip.

The preferred method of forming the lath as shown in Figs. 1 to 11 inclusive resides generally in feeding a strip of flexible fibrous material 30 preferably consisting of paper such as the ordinary pulp board of commerce, and advancing a smooth strip from a roll 31 longitudinally between a series of fluting rollers indicated generally at 32 whereby the strip is formed with longitudinally extending corrugations to produce a series of parallel channels on each side of the strip; and filling the channel on one side of the strip with a suitable plastic composition which is fed to the advancing strip from a feed hopper 33 and is compressed into the channel on the strip as the latter passes between roller 34 and 35. The resultant ribbon of lath is trimmed on its longitudinal edges as it advances by suitable trimming knives 36 and is thereafter cut into panels of suitable length while the strip is advancing by means of a cut-off mechanism 37.

One margin of the butt end of each panel thus formed is fitted with a flap 38 which is effected by adhering a strip of suitable material, such as paper to the side of the panel carrying the composition rib or slats. In trimming the longitudinal edges by the means of the cutter 36 severance is effected along a line that will afford a flap 39 along the marginal rib as shown in Fig. 13. The flaps 38 and 39 serve to permit the formation of a lap joint between the adjacent panels when applying the latter to a wall surface.

In forming the flutes or corrugations on the paper sheet the latter is subjected successively to the action of a series of rollers of such different character as to gradually and progressively gather and bend the sheet into the desired form without excessively stretching the material being worked so as to avoid rupturing of the sheet, and the formation of the corrugations is effected successively transversely of the sheet so that the latter will be gathered laterally little by little as it advances. In effecting this action, I employ a series of pairs of idle rollers 40 and 41 that are offset progressively as particularly shown in Fig. 4; the upper roller 40 having its periphery rounded transversely and the lower roller 41 being formed with concave channel as particularly shown in Fig. 6. As the sheet passes between these rollers, it is gathered slightly and drawn in laterally to form shallow longitudinal channels after which it passes between a second series of pairs of idle rollers 42 and 43 having the same conformation as the rollers 40 and 41 but have increased diameters whereby the channels formed by the rollers 40 and 41 are deepened as shown in Fig. 7, by further gathering of the sheet. The sheet then passes between pairs of rollers 44 and 45 the uppermost rollers 44 of which are positively driven; the upper rollers having their peripheries rounded transversely and the lower rollers 45 having peripherical channels formed with flat sides and a concave bottom wall as particularly shown in Fig. 8. This set of rollers 44 and 45 serves to form the channel in the sheet with parallel side walls and a concave bottom wall to afford a fullness. The sheet then passes between rollers 46 and 47 the uppermost of which is positively driven and is formed with concave peripherial channels, while the lower roller 47 is formed with peripherial channels the side walls of which are straight and the bottom wall of which is convex as particularly shown in Fig. 9. These rollers 46 and 47 serve to reverse the bottom walls of the channels in the sheet and form the bottom walls in the sheet convex to provide a fullness which is subsequently straightened out by passing the sheet through a series of rollers 48 and 49 the lowermost of which rollers is smooth throughout its periphery and the uppermost of which is formed with peripherial ribs having flat side walls and flat perimeters. The ribs are adapted to extend into the channels formed in the sheet in spaced relation to the bottom of such channels. These rollers 48 and 49 constitute the compressing rollers 34 before referred to and serve on compressing the composition in the channels on the sheet to force the side walls of the channels outwardly while straightening the bottom walls thereof so that the channels extending between the composition ribs will have dove-tail cross section as particularly shown in Fig. 10. The channels in the sheet will then be but partly filled with the composition after which an additional supply of the composition delivered to the channels from the hopper 33 is removed by means of plow 50, the composition is again subjected to pressure by being passed through the pair of rollers 35 both of which are smooth throughout as shown in Fig. 11. The pairs of rollers 34 and 35 may be heated where the composition employed is such as to require it, and in which event the advancing ribbon of lath, may also be heated by passing over a steam table 51 extending intermediate the pairs of rollers 34 and 35.

In the modified form of the invention as shown in Figs. 16 to 22 inclusive the side walls of the channel extending between the composition rib or slat are formed with parallel side walls provided with indentation 52. In effecting this construction the pairs of rollers 44, 45 and 46, 47 are dispensed with and a pair of rollers 53 has a flat peripherial face and extends into an annular channel 54 on the roller having straight side walls and a flat bottom wall as particularly shown in Fig. 16. The channels thus formed in the sheet may be partially filled with the composition as shown in Fig. 17 and thereafter completely filled as shown in Fig. 18, as before described or if desired they may be completely filled in one operation. After thus forming the composition slat and while the composition is still soft the advancing sheet passes over a series of indenting rollers 55 which extend into the spaces between the composition slats and has two toothed peripheries adapted to effect rolling contact with the side walls of the channels to form the desired indentation 52 as shown in Figs. 20 and 21. The resultant product will then appear as shown in Fig. 22.

In some instances it may be desirable to cover the backs of the composition slats with reinforcing strips 56 as shown in Fig. 23, which construction is desirable where the composition employed consists of a gypsum mixture. In this instance strips of paper or other suitable flexible material are impressed by a roller or rollers 57 on to the composition as shown in Fig. 24. These strips while reinforcing the composition slats do not detract from the flexibility of the finished product.

Any suitable composition may be employed for forming the slats but I have found in practice that a gypsum mixture such as is employed in the manufacture of wall board, or a mixture of tar asphaltum or the like with sawdust or other granulated or fibrous material may be used to good advantage. In some instances wooden slats may be fixed in the channels.

While I have shown the sheet as gathered from one edge thereof to the other it is obvious that it may be worked from the center or intermediate portion toward the edges.

I claim:

1. The method of forming a lath panel consisting in feeding a ribbon of flexible fibrous material, initially gathering the material transversely to form shallow longitudinal channels upon said ribbon and thereafter deepening the channels by further gathering of the material transversely, and filling the channels with a plastic composition.

2. The method of forming a lath panel consisting in feeding a ribbon of flexible fibrous material longitudinally, initially gathering the material of the ribbon to form shallow longitudinal channels on said ribbon, said initial gathering of the material being effected progressively longitudinally of the ribbon, and thereafter deepening the channels by further gathering of the material transversely and filling the channels with a plastic composition.

3. The method of forming a lath panel consisting in feeding a ribbon of flexible fibrous material, forming a series of parallel longitudinally extending shallow channels on said ribbon by gathering the material and forming the several channels successively after forming an initial channel, thereafter deepening the channels successively, then working the material to form the channels with parallel side walls, and filling the channels thus formed with a plastic composition.

4. The method of forming a lath panel consisting in a ribbon of flexible fibrous material, forming a series of parallel longitudinally extending shallow channels on said ribbon by gathering the material, and forming the several channels successively after forming an initial channel, thereafter deepening the channels, successively, then working the material to form the channels with parallel side walls, filling the channels thus formed with a plastic composition, and thereafter subjecting the ribbon and the plastic material thereon to pressure to form the channels of dove-tail cross sections.

5. The method of forming a lath panel consisting in forming a continuous sheet of fibrous material with parallel channels, filling the channels on one side of the sheet with a plastic composition to form spaced ribs, and thereafter pressing portions of the walls of the channels into the plastic ribs.

In testimony whereof, I have affixed my signature.

GEORGE A. BUTTRESS.